United States Patent
Chang (10) Patent No.: US 7,722,241 B2
(45) Date of Patent: *May 25, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 232 days.

This patent is subject to a terminal disclaimer.

(21) Appl. No.: 11/845,792

(22) Filed: Aug. 28, 2007

(65) Prior Publication Data
US 2008/0266876 A1 Oct. 30, 2008

(30) Foreign Application Priority Data
Apr. 26, 2007 (CN) .................. 2007 1 0200512

(51) Int. Cl.
*F21V 7/04* (2006.01)
(52) U.S. Cl. .................. 362/620; 362/626; 362/612
(58) Field of Classification Search .......... 362/600–634
See application file for complete search history.

(56) References Cited

U.S. PATENT DOCUMENTS

| | | | |
|---|---|---|---|
| 6,752,505 B2 * | 6/2004 | Parker et al. ............. | 362/627 |
| 6,925,243 B2 * | 8/2005 | Lin ......................... | 385/146 |
| 7,160,016 B2 * | 1/2007 | Yu et al. .................. | 362/620 |
| 7,422,357 B1 * | 9/2008 | Chang ...................... | 362/602 |
| 7,458,714 B2 * | 12/2008 | Chang ...................... | 362/626 |
| 2007/0147073 A1 * | 6/2007 | Sakai et al. ............... | 362/607 |
| 2007/0147089 A1 * | 6/2007 | Lin et al. .................. | 362/616 |
| 2007/0165394 A1 * | 7/2007 | Chang ...................... | 362/97 |

* cited by examiner

*Primary Examiner*—Sandra L O'Shea
*Assistant Examiner*—Evan Dzierzynski
(74) *Attorney, Agent, or Firm*—Frank R. Niranjan (57) ABSTRACT

An exemplary optical plate includes at least one transparent plate section. The transparent plate section includes a light output surface, a bottom surface, a plurality of spherical protrusions, a plurality of microstructures, and a lamp-receiving portion. The light output surface is opposite to the bottom surface. The spherical protrusions are formed on the light output surface. The microstructures are formed on the bottom surface. The lamp-receiving portion is defined in the bottom surface. A backlight module using the present optical plate is also provided.

15 Claims, 14 Drawing Sheets

OPTICAL PLATE AND BACKLIGHT MODULE USING THE SAME

CROSS-REFERENCE TO RELATED APPLICATIONS

This application is related to thirteen copending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007; application Ser. No. 11/836,799, filed on Aug. 10, 2007; application Ser. No. 11/842,170, filed on Aug. 21, 2007; applicant Ser. No. 11/843,669, and Ser. No. 11/843,670, filed on Aug. 23, 2007; application Ser. Nos. 11/845,793 and 11/845,794, and all entitled "OPTICAL PLATE AND BACKLIGHT MODULE USING THE SAME"; In all these copending applications, the inventor is Shao-Han Chang. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically employed in a liquid crystal display (LCD).

2. Discussion of the Related Art

In a liquid crystal display device, liquid crystal is a substance that does not itself illuminate light. Instead, the liquid crystal relies on light received from a light source to display data images. In the case of a typical liquid crystal display device, a backlight module powered by electricity supplies the needed light.

Figure 14:
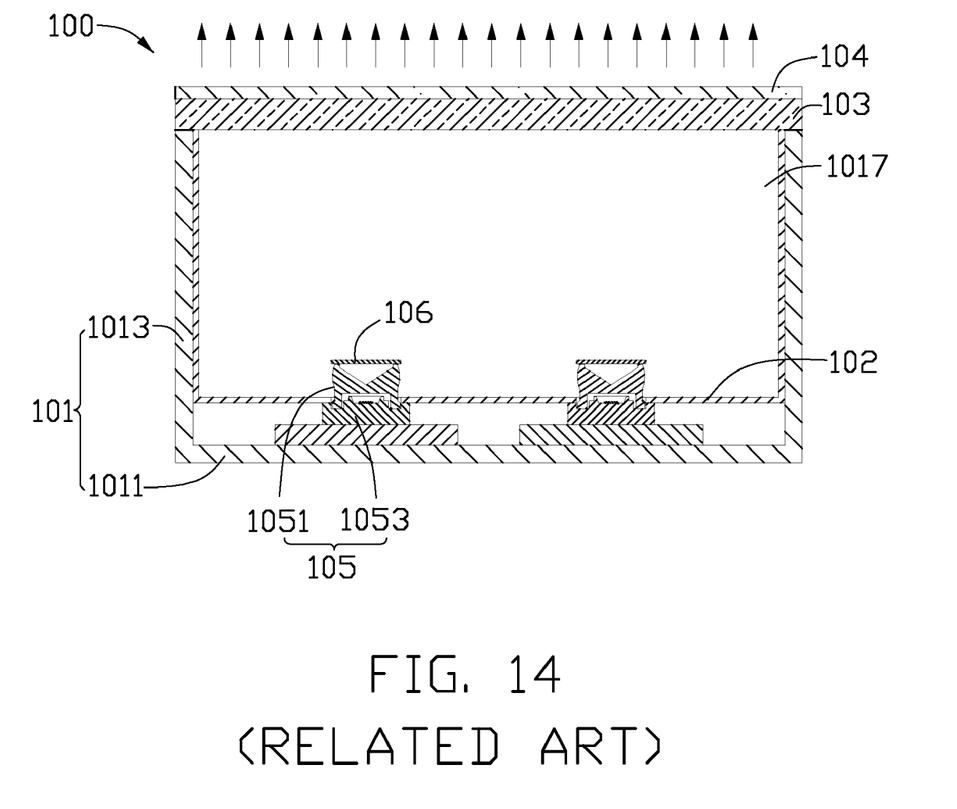
FIG. 14 is a side cross-sectional view of a conventional backlight module.

FIG. 14 represents a typical direct type backlight module 100. The backlight module 100 includes a housing 101, a light reflective plate 102, a light diffusion plate 103, a prism sheet 104, and a plurality of light emitting diodes 105 (hereinafter called LEDs). The housing 101 includes a rectangular base 1011 and four sidewalls 1013 extending around a periphery of the base 1011. The base 1011 and the four sidewalls 1013 cooperatively define a chamber 1017. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 1017. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputted from the prism sheet 104.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. As a result, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes one or more transparent plate section. The transparent plate section includes a first surface, a second surface, a plurality of microstructures, a plurality of spherical protrusions and a lamp-receiving portion. The second surface is opposite to the first surface. The microstructures are formed on the first surface. Each microstructure includes at least three side surfaces connected with each other, a transverse width of each side surface decreasing along a direction away from the first surface. The spherical protrusions are formed on the second surface. The lamp-receiving portion is defined in at least one of the first surface and the second surface.

A backlight module according to a preferred embodiment includes a housing, one or more light emitting diode, one or more reflective member, an optical plate, and a light diffusion plate. The housing includes a base and a plurality of sidewalls extending around a periphery of the base, the base and the sidewalls cooperatively forming an opening. The light emitting diode is disposed on the base, each light emitting diode having a light-emitting portion. Each reflective member is disposed above the top portion of the light-emitting portion of the corresponding light emitting diode. The same optical plate as described in the previous paragraph is employed in this embodiment. The light-emitting portion of the light emitting diode is inserted in the lamp received portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
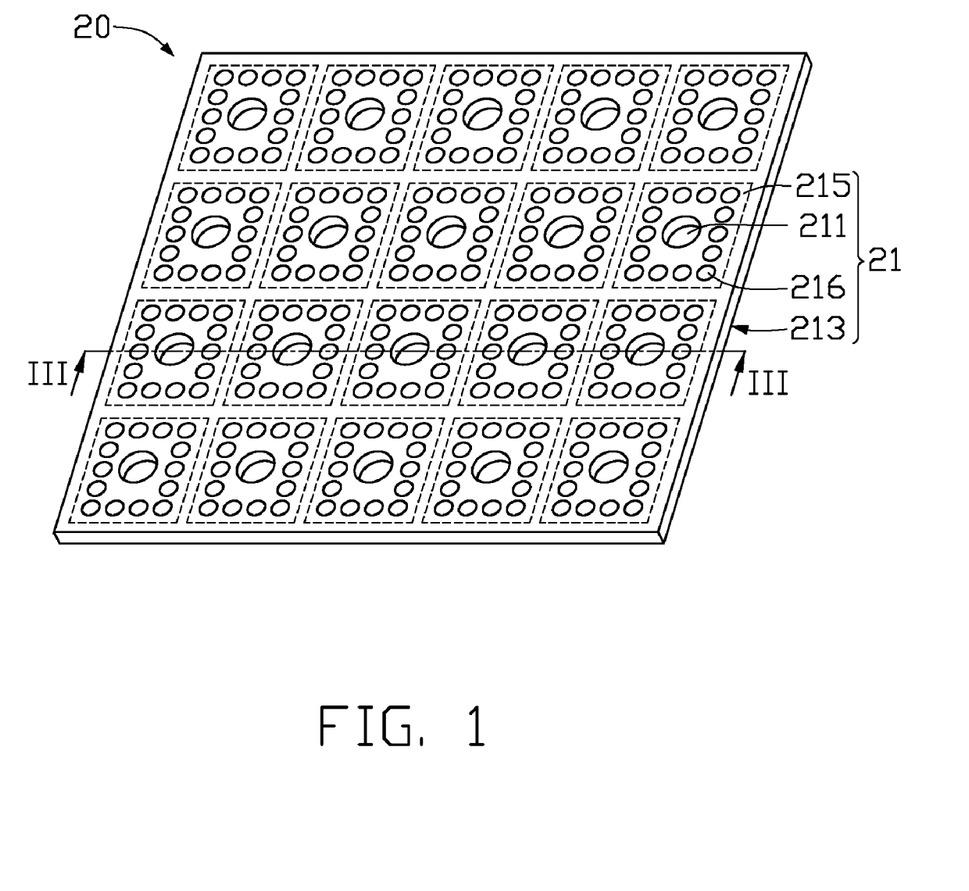
FIG. 1 is an isometric view of the optical plate according to a first preferred embodiment of the present invention.
Figure 2:
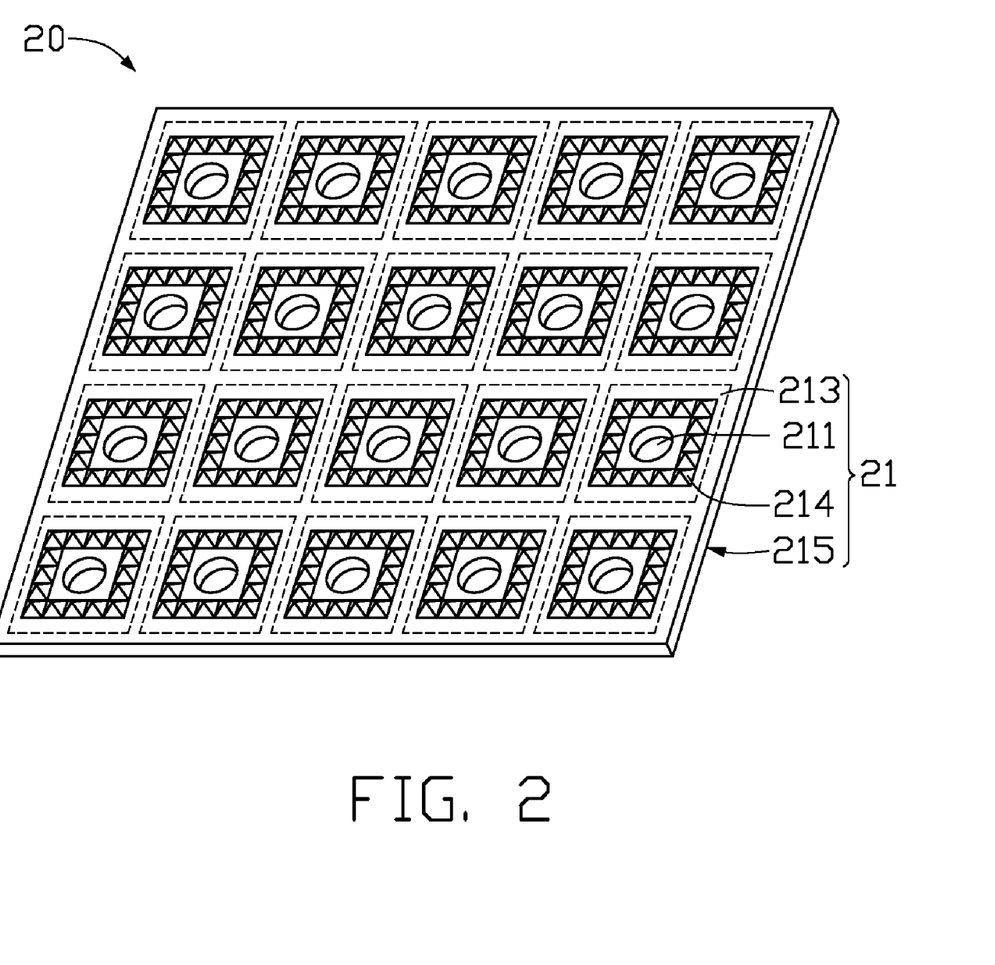
FIG. 2 is similar to FIG. 1, but viewed from another aspect.
Figure 3:
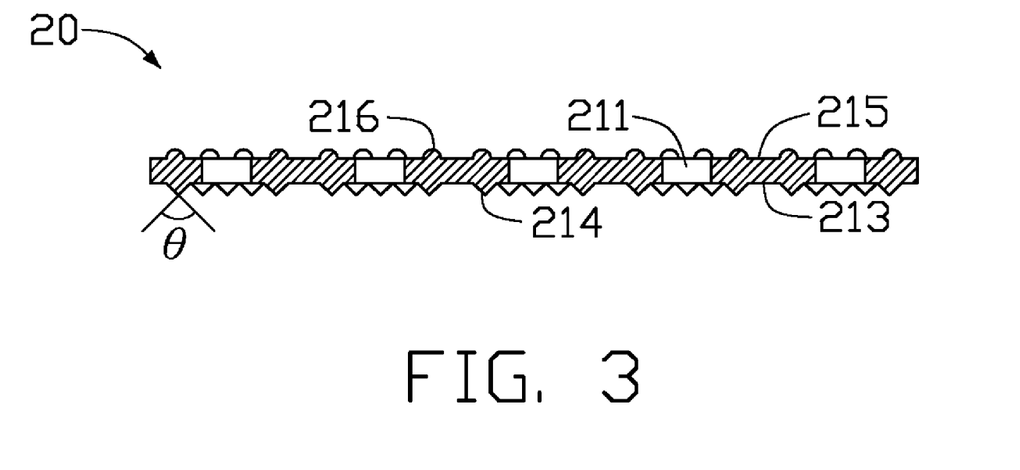
FIG. 3 is a side cross-sectional view taken along line III-III of FIG. 1.

Referring to FIGS. 1 through 3, an optical plate 20 in accordance with a first preferred embodiment of the present invention is shown. The optical plate 20 is a transparent plate. The optical plate 20 includes a light output surface 215 (shown in FIG. 1) and a bottom surface 213 (shown in FIG. 2) opposite to the light output surface 215. A plurality of spherical protrusions 216 are formed on the light output surface 215. A plurality of microstructures 214 are formed on the bottom surface 213. The optical plate 20 further includes a plurality of lamp-receiving portions 211 defined in the bottom surface 213. Each lamp-receiving portion 211 is a through hole that communicates between the light output surface 215 and the bottom surface 213. In the first preferred embodiment, the optical plate 20 can be divided into twenty smaller transparent plate sections 21 arranged side by side in a matrix manner, each transparent plate section 21 is substantially a square. In each transparent plate section 21, the lamp-receiving portion 211 is defined at a center of the transparent plate section 21. The microstructures 214 are distributed on the bottom surface 213 surrounding the lamp-receiving portion 211 in the transparent plate sections 21. The spherical protrusions 216 are distributed on the light output surface 215 surrounding the lamp-receiving portion 211 in a manner forming a rectangle around the lamp-receiving portion 211.

In the first preferred embodiment, a radius defined by each spherical protrusion 216 is preferably in a range from about 0.01 millimeters to about 2 millimeters. A maximum height of each spherical protrusion 216 is in a range from about 0.01 millimeters to about 2 millimeters. Each microstructure 214 includes four side surfaces (not labeled) connected with each other, a transverse width of each side surface decreasing along a direction away from the light output surface 215. Also referring to FIG. 3, a dihedral angle θ defined by two opposite side surfaces of each of the microstructures 214 is configured to be in a range from about 60 degrees to about 120 degrees.

The optical plate 20 can be made from material selected from the group consisting of polycarbonate (PC), polymethyl methacrylate (PMMA), polystyrene (PS), copolymer of methylmethacrylate and styrene (MS), and any suitable combination thereof. A thickness of the optical plate 20 is, preferably, in a range from 0.5 millimeters to about 5 millimeters.

Figure 4:
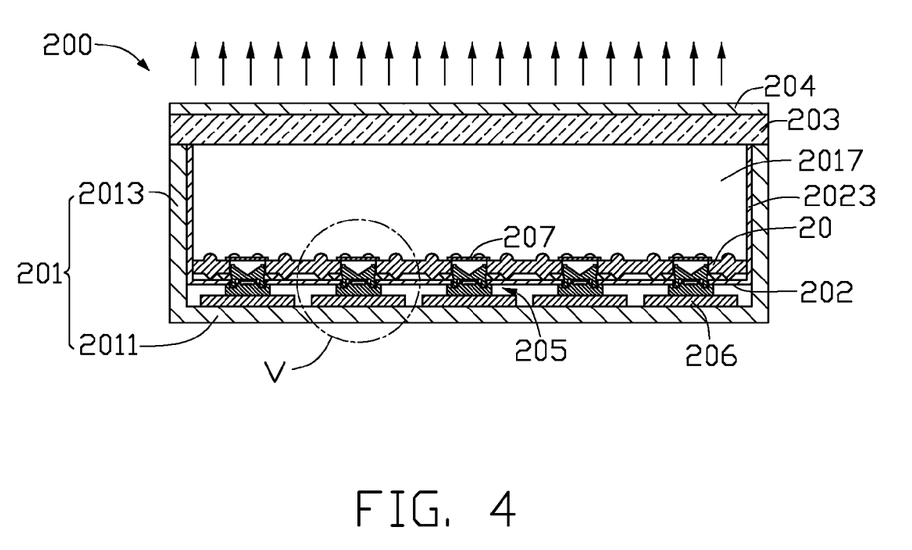
FIG. 4 is a side cross-sectional view of a backlight module using the optical plate shown in FIG. 1 according to a second preferred embodiment of the present invention.

Referring to FIG. 4, a backlight module 200 in accordance with a second preferred embodiment of the present invention is shown. The backlight module 200 includes a housing 201, a light reflective plate 202, a light diffusion plate 203, a plurality of light-emitting diodes (LEDs) 205, a plurality of reflective members 207, and the optical plate 20. The same optical plate 20 as described in the first preferred embodiment is employed in the second preferred embodiment. The housing 201 includes a rectangular base 2011 and four sidewalls 2013 extending around a periphery of the base 2011, the base 2011 and the sidewalls 2013 cooperatively defining an opening 2017. The optical plate 20, the light reflective plate 202 and the LEDs 205 are received in the housing 201. The light diffusion plate 203 is disposed on the housing 201 over the opening 2017.

Figure 5:
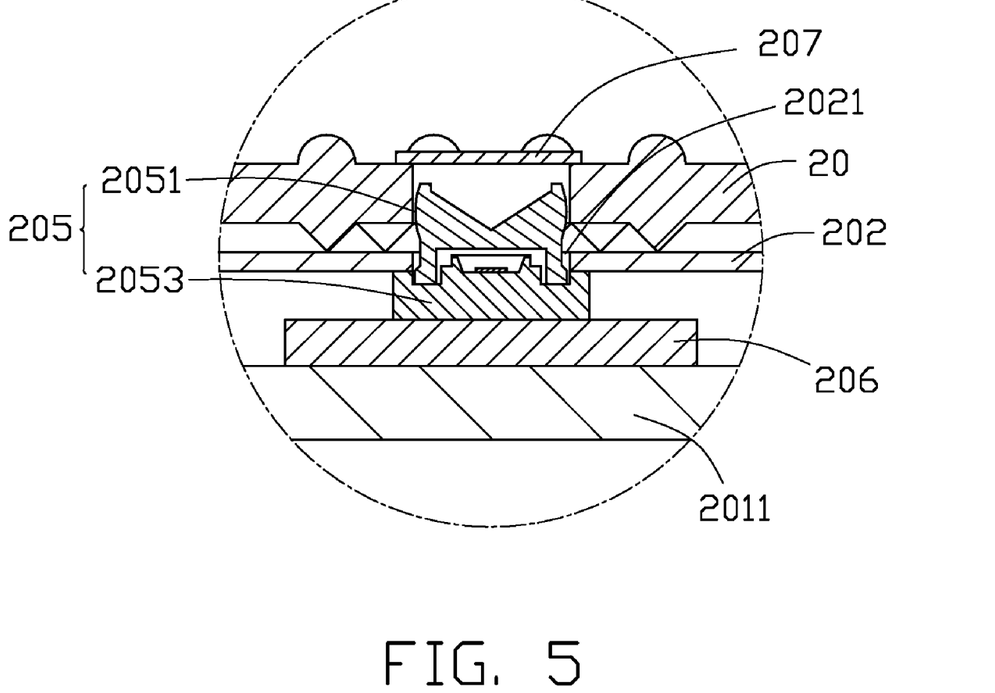
FIG. 5 is an enlarged view of a circled portion V of FIG. 4.

Referring to FIG. 5, each LED 205 includes a base portion 2053, a light-emitting portion 2051 disposed on the base portion 2053. The LEDs 205 are electrically connected to a printed circuit board 206 that is fixed to the base 2011 of the housing 201. In this embodiment, each reflective member 207 is a light reflective sheet that is disposed on the top of the corresponding light-emitting portion 251. In an alternative embodiment, each reflective member 207 can be a light reflective film formed on the top of the corresponding light-emitting portion 2051 or on the optical plate 20 above the lamp-receiving portion 211.

The light-emitting portions 2051 of the LEDs 205 are inserted into the lamp-receiving portions 211 of the optical plate 20, and the light output surface 215 of the optical plate 20 faces the light diffusion plate 203. The light reflective plate 202 defines a plurality of through holes 2021 therein corresponding to the lamp-receiving portions 211 of the optical plate 20. The light reflective plate 202 is disposed on the bottom surface 213 of the optical plate 20 with the light-emitting portions 2051 of the LEDs 205 passing through the through holes 2021 of the light reflective plate 202 correspondingly. The light reflective plate 202 and the optical plate 20 are supported by the base portions 2053 of the LEDs 205.

In use, light emitted from the light-emitting portions 2051 of the LEDs 205 enters the optical plate 20 via inner surfaces of the lamp-receiving portions 211. A significant amount of the light is transmitted through the optical plate 20. Since the surfaces of the microstructures 214 are slanted, incident light that may have been internally reflected on a flat surface, are refracted at the slanted surfaces of the microstructures 214. As a result, a great amount of light is able to be outputted, from the light output surface 215, faster.

In addition, the spherical protrusions 216 can condense and collimate light exiting from the, thereby improving an illumination brightness of the backlight module 200. Furthermore, because the LEDs 205 are positioned in the lamp-receiving portions 211, light is uniformly outputted from the light output surface 215 of the optical plate 20. Light from the optical plate 20 can be further substantially mixed in a chamber between the optical plate 20 and the light diffusion plate 203, and before passing through the light diffusion plate 203 as uniform surface light. Distances from the LEDs 205 to the light diffusion plate 203 may be configured to be very small, with little or no risk of having dark areas on the portion of the backlight module 200 directly above the LED 205. Accordingly, the backlight module 200 can have a compact configuration while still providing good, uniform optical performance.

It should be pointed out that, the light reflective plate 202 can be omitted. In an alternative embodiment, a high reflectivity film can be deposited on inner surfaces of the base 2011 and the sidewalls 2013 of the housing 201. In other alternative embodiments, the housing 201 can be made of metal materials, thus the housing 201 has high reflectivity inner surface.

It is to be understood that, in order to improve a brightness of the backlight module 200 within a specific range of viewing angles, the backlight module 200 can further include a prism sheet 204 disposed on the light diffusion plate 203. In addition, in order to improve light energy utilization rate of the backlight module 200, the light reflective plate 202 can further include four reflective sidewalls 2023 extending around a periphery thereof and contacting with the sidewalls 2013 of the housing 201.

Figure 6:
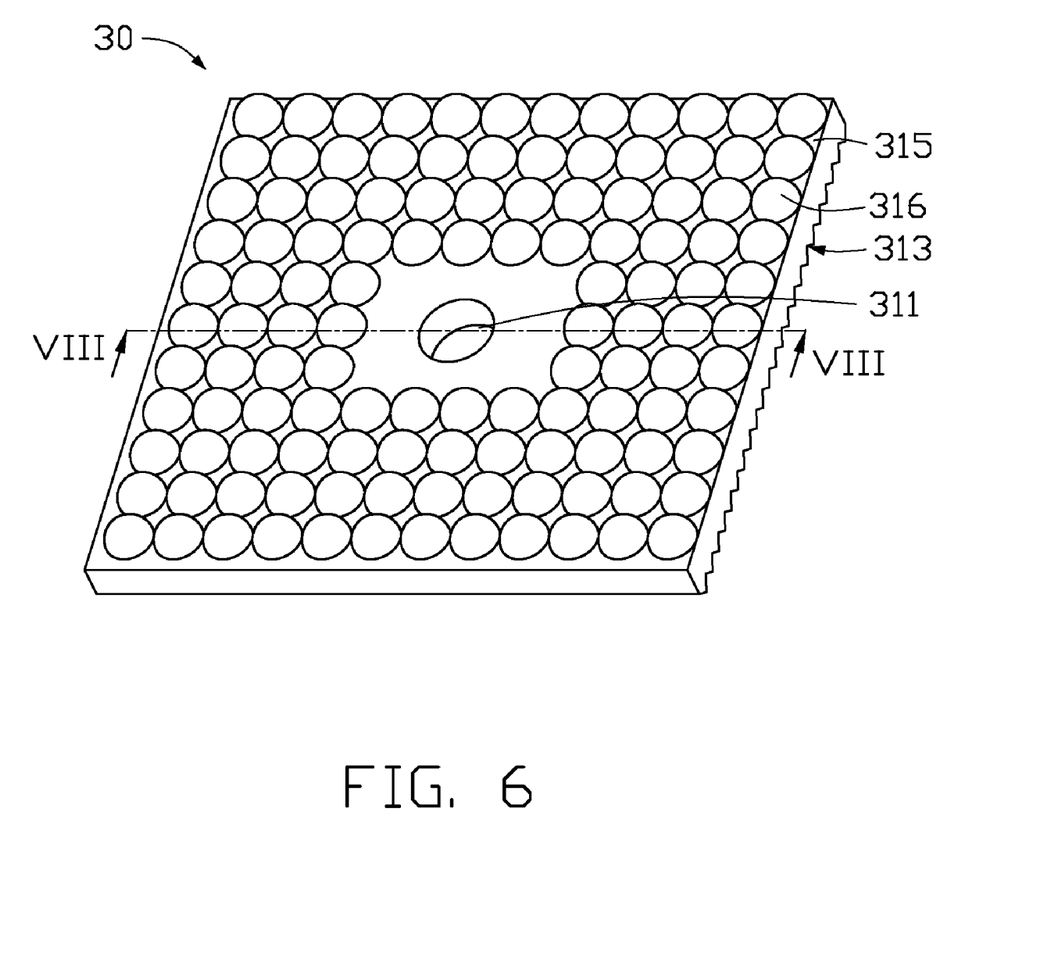
FIG. 6 is an isometric view of an optical plate according to a third preferred embodiment of the present invention.
Figure 7:
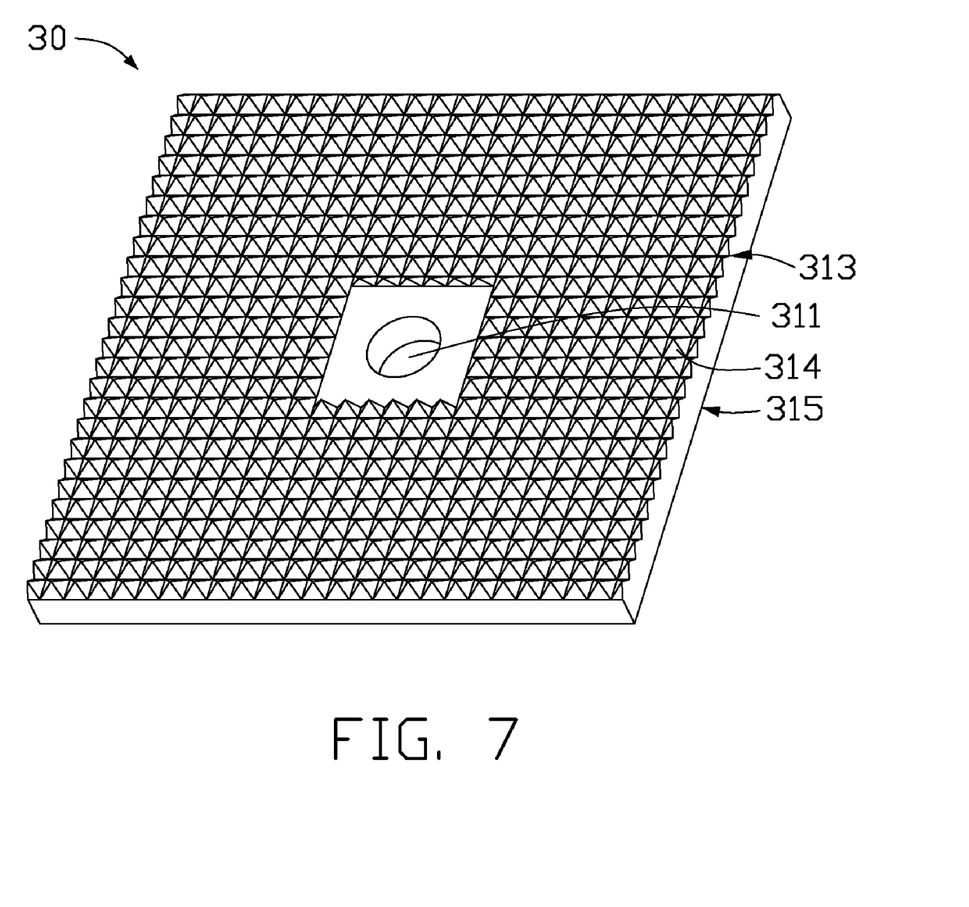
FIG. 7 is similar to FIG. 6, but viewed from another aspect.
Figure 8:
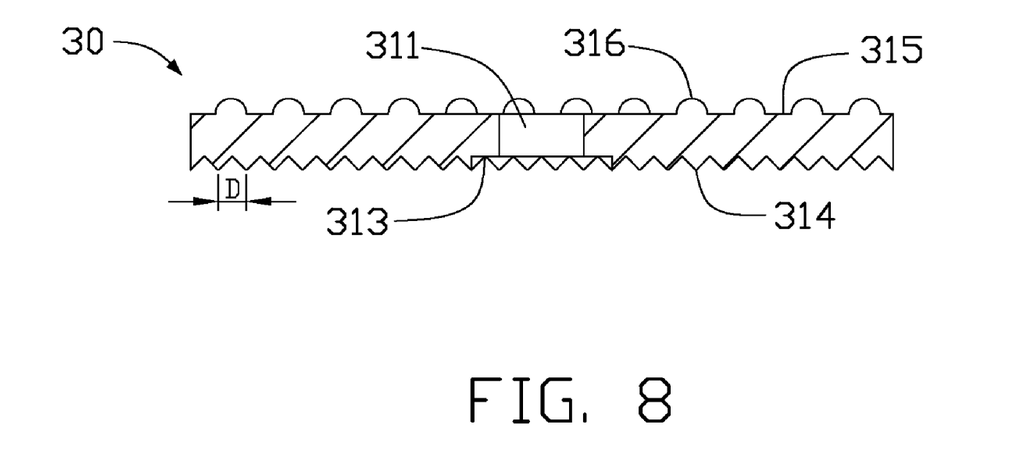
FIG. 8 is a cross-sectional view taken along line VIII-VIII of FIG. 6.

Referring to FIGS. 6 through 8, an optical plate 30 in accordance with a third preferred embodiment is shown. The optical plate 30 is similar in principle to the optical plate 20 of the first embodiment. A plurality of spherical protrusions 316 are formed on the light output surface 315 and a plurality of microstructures 314 are formed on the bottom surface 313. However, only a lamp-receiving portion 311 is defined at a center of optical plate 30 communicating between a light output surface 315 and a bottom surface 313. In the illustrated embodiment, a pitch D of two adjacent microstructures 314 is in a range from about 0.025 millimeters to about 2 millimeters.

Figure 9:
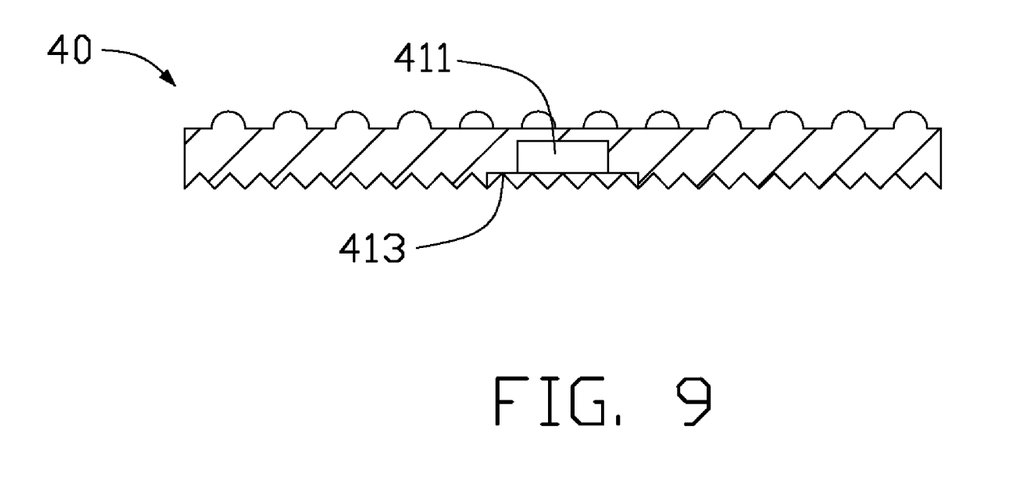
FIG. 9 is a side cross-sectional view of an optical plate according to a fourth preferred embodiment of the present invention.

Referring to FIG. 9, an optical plate 40 in accordance with a fourth preferred embodiment is shown. The optical plate 40 is similar in principle to the optical plate 30, except that a lamp-receiving portion 411 of the optical plate 40 is a blind hole. It should be pointed out that, a LED with a reflective member formed on the top of the light-emitting portion can be mounted into the lamp-receiving portion 411 of the optical plate 40 to form a backlight module. Alternatively, a reflective member of the LED can be also positioned on a part of the optical plate 40 above the lamp-receiving portion 411.

Figure 10:
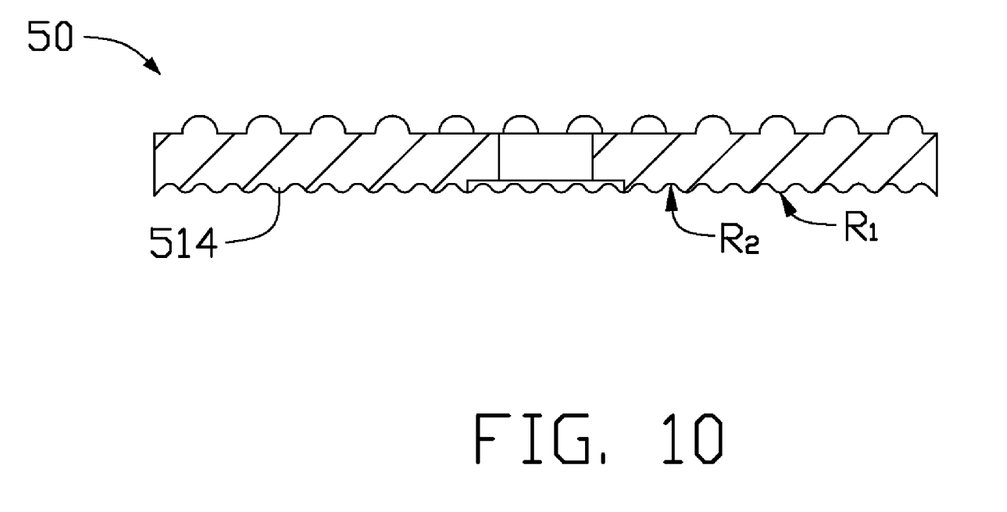
FIG. 10 is a side cross-sectional view of an optical plate according to a fifth preferred embodiment of the present invention.

Referring to FIG. 10, an optical plate 50 in accordance with a fifth preferred embodiment is shown. The optical plate 50 is similar in principle to the optical plate 30, except that either a top end of each microstructure 514, or a bottom edge defined by the boundary formed by the bases of two adjacent microstructures 514 are rounded. A curvature of this rounded surface is defined by a sphere of radius R. The radius $R_1$ of the rounded top end and the radius $R_2$ of the rounded bottom edge is equal to or less than 1.1 millimeters, and greater than zero.

Figure 11:
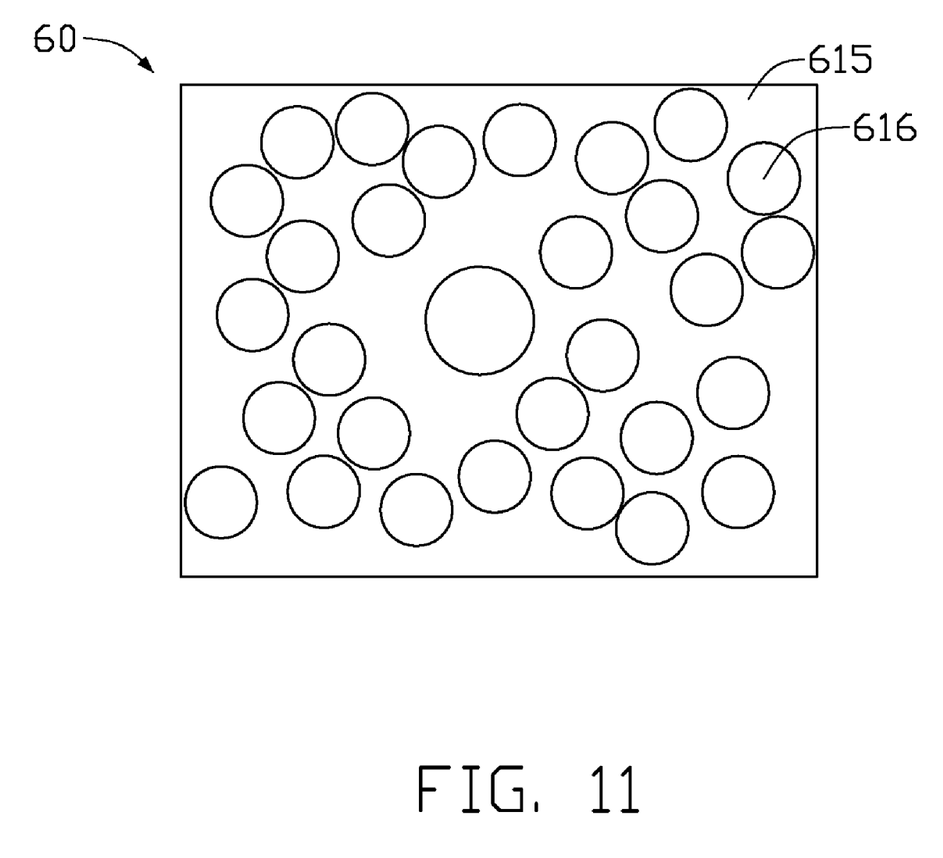
FIG. 11 is a top plane view of an optical plate according to a sixth preferred embodiment of the present invention.

Referring to FIG. 11, an optical plate 60 in accordance with a sixth preferred embodiment is shown. The optical plate 60 is similar in principle to the optical plate 30, except that a plurality of spherical protrusions 616 are randomly distributed at a light output surface 615.

Figure 12:
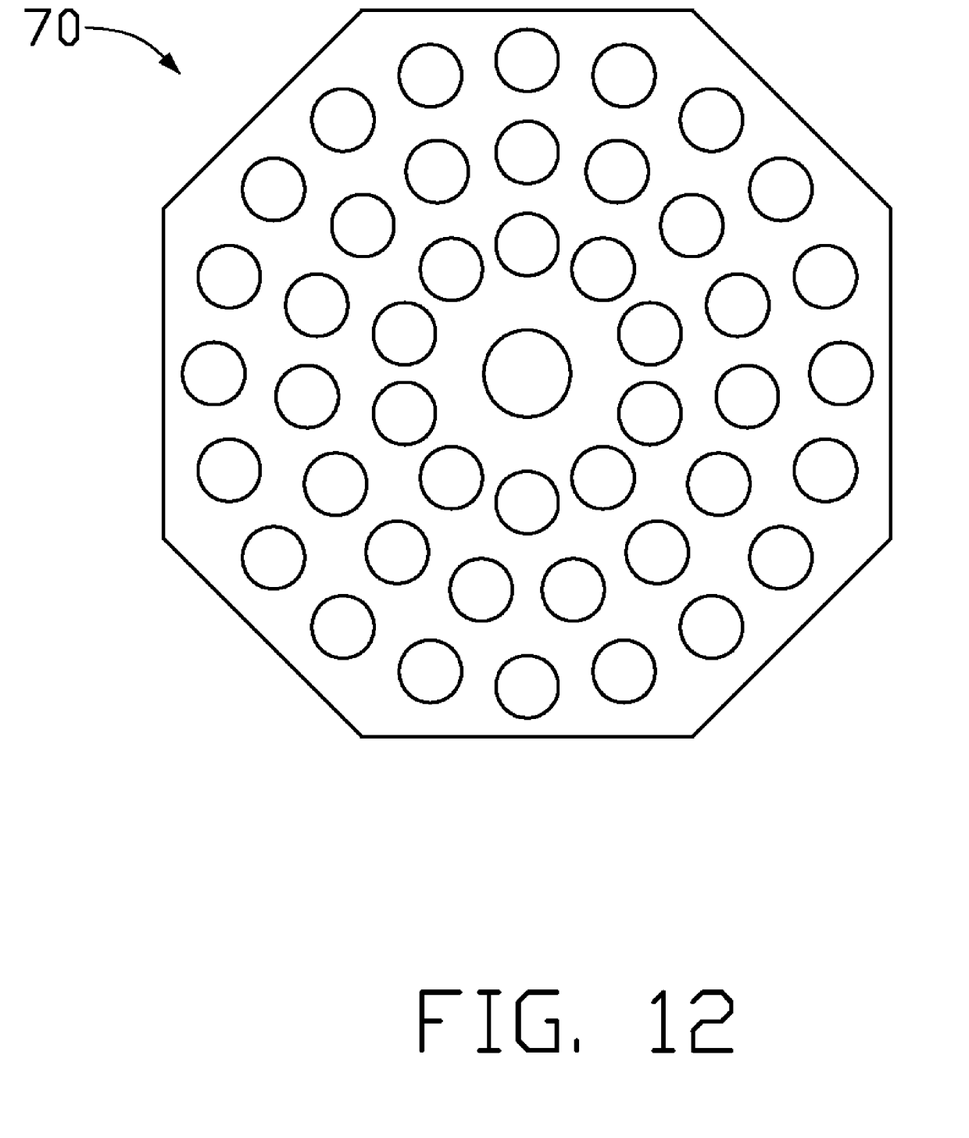
FIG. 12 is a top plane view of an optical plate according to a seventh preferred embodiment of the present invention.

Referring to FIG. 12, an optical plate 70 in accordance with a seventh preferred embodiment is shown. The optical plate 70 is similar in principle to the optical plate 30, except that the optical plate 90 is an octagonal in shape.

Figure 13:
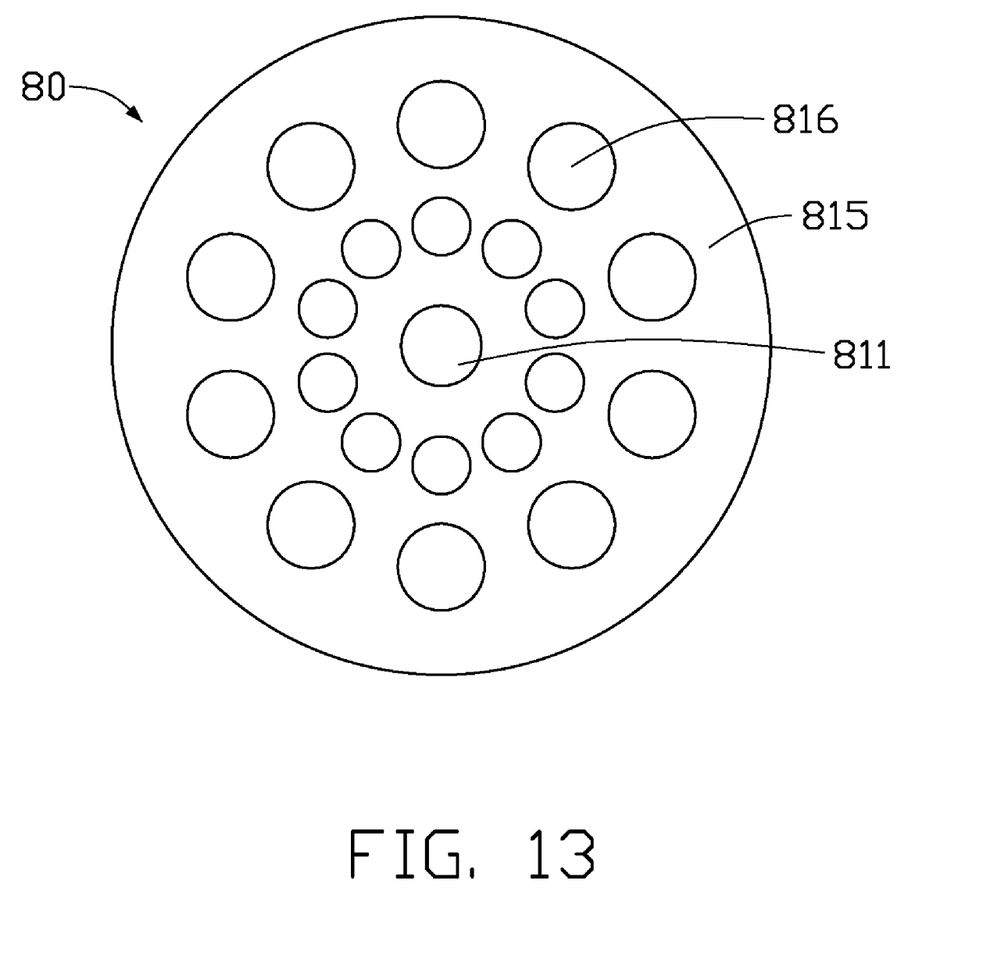
FIG. 13 is a top plane view of an optical plate according to a eighth preferred embodiment of the present invention.

Referring to FIG. 13, an optical plate 80 in accordance with an eighth preferred embodiment is shown. The optical plate 80 is similar in principle to the optical plate 30, except that a plurality of spherical protrusions 816 are formed on the light output surface 815 surrounding a lamp-receiving portion 811 and a diameter of each spherical protrusion 816 increases along a receding direction from the lamp-receiving portion 811. In the illustrated embodiment, the spherical protrusions 816 are distributed symmetrically with respect to the lamp-receiving portion 811. The further the distance between a spherical protrusion 816 and the lamp-receiving portion 811, more light is refracted by the spherical protrusion 816. Thus, uniformity of the light exiting the optical plate is further improved. In other alternative embodiment, if the diameters of the spherical protrusion 816 are identical to each other, the same optical performance can be achieved at varying distances from the lamp-receiving portion 811.

It is noted that the scope of the present optical plate is not limited to the above-described embodiments. In particular, even though specific shape of microstructures (four-sided pyramidal protrusion) 214, 314 have been described and illustrated, the microstructures 214, 314 can have various other suitable shapes. For example, the microstructures can be three-sided (triangular) pyramidal protrusions, five-sided (pentagonal) pyramidal protrusions, multi-sided (polygonal) pyramidal protrusions, or frustums of these.

It should be noted that, the backlight module 200 is not limited to be configured with the optical plate 20 positioned in the housing 201 having the light output surface 215 facing the light diffusion plate 203, but can also be configured with the optical plate 20 positioned in the housing 201 having the bottom surface 213 facing the light diffusion plate 203. That is, the microstructures 214 are formed on a first surface of the optical plate 20, and the spherical protrusion 216 are formed on a second surface of the optical plate 20. The first surface is selected from one of the light output surface 215 and the bottom surface 213, and the second surface is selected from the other one of the light output surface 215 and the bottom surface 213. However, if a lamp-receiving portion is a blind hole, a surface where the blind hole is defined must be a bottom surface and the other surface must be a light output surface.

In the backlight module 200, a plurality of red, green, and blue colored LEDs can be inserted into the lamp-receiving portions 211 of the optical plate 20, such that a blended white surface light can be obtained. It is to be understood that other kinds of point light source, such as field emission lamps and so on, can replace the LED 205 in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
at least one transparent plate section having:
a first surface;
a second surface opposite to the first surface;
a plurality of microstructures formed on the first surface, wherein each microstructure comprises at least three side surfaces connected with each other, a transverse width of each side surface decreases along a direction away from the first surface, a top end of each microstructure and bottom edges defined by the boundary formed by the bases of two adjacent microstructures are rounded;
a plurality of spherical protrusions formed on the second surface; and
at least one lamp-receiving portion defined in at least one of the first surface and the second surface.

2. The optical plate according to claim 1, wherein the microstructures are rectangular pyramidal protrusions, a dihedral angle defined by two opposite side surfaces of each of the microstructures is configured to be in a range from about 60 degrees to about 120 degrees.

3. The optical plate according to claim 1, wherein the microstructures are rectangular pyramidal protrusions, a pitch of the two adjacent microstructures is configured to be in a range from about 0.025 millimeters to about 2 millimeters.

4. The optical plate according to claim 1, wherein the spherical protrusions are formed on the second surface in a matrix manner.

5. The optical plate according to claim 1, wherein the spherical protrusions are distributed symmetrically with respect to the lamp-receiving portion.

6. The optical plate according to claim 1, wherein a diameter of each spherical protrusion increases along a receding direction from the lamp-receiving portion.

7. The optical plate according to claim 1, wherein the lamp-receiving portion is selected from one of blind hole and through hole communicating between the first surface and the second surface.

8. The optical plate according to claim 1, wherein the optical plate includes a plurality of the transparent plate sections, the transparent plate sections being tightly combined with each other.

9. A backlight module comprising:
a housing having a base and a plurality of sidewalls extending around a periphery of the base, the base and the sidewalls cooperatively forming an opening;
at least one point light source disposed on the base, each point light source having a light-emitting portion;
at least one reflective member is positioned above the top of the light-emitting portion;
an optical plate positioned in the housing, the optical plate including at least one transparent plate section having:
a first surface;
a second surface opposite to the first surface;
a plurality of microstructures formed on the first surface, wherein each microstructure comprises at least three side surfaces connected with each other, a transverse width of each side surface decreases along a direction away from the first surface; and a top end of each microstructure and bottom edges defined by the boundary formed by the bases of two adjacent microstructures are rounded;
a plurality of spherical protrusions formed on the second surface; and
a lamp-receiving portion defined in at least one of the first surface and the second surface, wherein the light-emitting portion of the at least one point light source is inserted in the lamp received portion; and
a light diffusion plate disposed on the housing over the opening.

10. The backlight module according to claim 9, further comprising a light reflective plate defining a through hole therein, the light reflective plate being disposed on the bottom surface of the optical plate, and the light emitting portion of the point light source passing through the through hole of light reflective plate correspondingly.

11. The backlight module according to claim 10, wherein the light reflective plate further comprises a plurality of reflective sidewalls extending around a periphery thereof and contacting with the sidewalls of the housing.

12. The backlight module according to claim 9, wherein the housing is made of metal materials, and has high reflectivity inner surface.

13. The backlight module according to claim 9, further comprising a high reflectivity film deposited on inner surface of the base and the sidewalls of the housing.

14. The backlight module according to claim 9, further comprising a prism sheet disposed on the light diffusion plate.

15. The backlight module according to claim 9, wherein the lamp-receiving portion is selected from one of blind hole and through hole communicating between the first surface and the second surface.

* * * * *